(12) United States Patent
Nguyen et al.

(10) Patent No.: US 7,571,190 B2
(45) Date of Patent: Aug. 4, 2009

(54) INSTANT MESSAGE BROADCASTING AND PRESENCE ENABLING FROM ELECTRONIC MAIL APPLICATION

(75) Inventors: Diem Nguyen, Milpitas, CA (US); Satish Singh, Sunnyvale, CA (US); Manisha Sahasrabudhe, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 309 days.

(21) Appl. No.: 11/233,296

(22) Filed: Sep. 21, 2005

(65) Prior Publication Data

US 2007/0067344 A1    Mar. 22, 2007

(51) Int. Cl.
G06F 17/00    (2006.01)
(52) U.S. Cl. .............. 707/104.1; 707/101; 707/102; 707/103 R; 709/205; 709/206; 709/207
(58) Field of Classification Search .......... 707/1–10, 707/100–104.1, 200–206; 709/204–207
See application file for complete search history.

(56) References Cited

U.S. PATENT DOCUMENTS

| 2004/0199581 A1* | 10/2004 | Kucharewski et al. ........ 709/204 |
| 2006/0101119 A1* | 5/2006 | Qureshi et al. .............. 709/206 |
| 2006/0116139 A1* | 6/2006 | Appelman .................. 455/466 |

* cited by examiner

Primary Examiner—Isaac M Woo (57) ABSTRACT

A system and method for broadcasting a message to multiple contacts in a list of contacts provided by an electronic mail application and furnishing presence information for contacts in the list of contacts provided by the electronic mail application includes an interface for adding functionality to an electronic mail application which supports instance messaging (IM). The interface interfaces with a distributed presence enabled communication platform for providing presence information regarding contact availability. The electronic mail application utilizes the interface for displaying the contact presence information and broadcasting a message to multiple contacts in the list of contacts.

5 Claims, 6 Drawing Sheets

INSTANT MESSAGE BROADCASTING AND PRESENCE ENABLING FROM ELECTRONIC MAIL APPLICATION

BACKGROUND OF THE INVENTION

The present invention relates generally to the field of electronic mail and messaging, and more particularly to a system and method for broadcasting a message to multiple contacts in a list of contacts provided by an electronic mail application and providing presence information for contacts in the list of contacts provided by the electronic mail application.

Instant messaging (IM) is an important technology for modern business. It has the ability to improve the communications efficiency of an organization; potentially lowering communications costs, reducing cycle times, improving customer retention, and enhancing partner effectiveness. IM allows workers to collaborate with colleagues, partners, and customers. Moreover, it can help to quickly solve business questions, share files, supplement conference calls, and provide other valuable workplace services. Generally, instant messaging utilizes real-time information about users, systems, and device availability, enabling both users and applications to make more informed decisions about information and request routing. For example, by determining a user's location, an IM application can route information to the appropriate computer or device, providing the critical information in a timely fashion.

Instant messaging utilizes an underlying technical capability known as presence. Broadly, presence refers to information about a user's availability. By indicating which users are available online and which users are away (e.g., away from their computer terminals), a presence service provides information for determining who is available to answer a question, complete a task, collaborate, and the like. For instance, knowing that a user is available often allows for an immediate response to a request for information or an urgent task. Visualization of user availability provided by typical IM services is also important, since a variety of users may be qualified to handle a request or task. Typically, visualization of user availability is provided in the form of an icon or visual cue alerting a user to the status of another user (e.g., one icon for representing a user is online and another for representing the user is away).

Many electronic mail applications incorporate some form of instant messaging along with electronic mail functionality, such as the ability to send an instant message to an electronic mail contact. However, these electronic mail applications do not include functionality for broadcasting an instant message to more than one contact. Thus, it is not possible to simultaneously send a common message to several contacts. Instead, in present applications, a user must copy the message and send it to each contact individually. This process is time consuming and can result in errors as the message is copied. Moreover, these electronic mail applications do not integrate contact information with presence information obtained from a distributed presence enabled communication platform. Thus, the applications can only provide IM status, and cannot provide integrated presence information such as telephone or mobile telephone availability, office availability, pager availability, and the like.

Consequently, it would be desirable to provide an electronic mail application with the ability to broadcast a message to multiple contacts in a list of contacts provided by the electronic mail application, and to integrate contact information with presence information from a distributed presence enable communication platform to furnish presence information for contacts within the list of contacts.

SUMMARY OF THE INVENTION

Accordingly, the present invention is directed to a system and method for broadcasting a message to multiple contacts in a list of contacts provided by an electronic mail application and providing presence information for contacts in the list of contacts provided by the electronic mail application.

The present invention adds functionality to the electronic mail application, which supports instance messaging (IM). In exemplary embodiments, the present invention employs an interface, which may be implemented via a plug-in application, which interfaces with a distributed presence enabled communication platform for providing presence information regarding contact availability. The distributed presence enabled communication platform includes an application programming interface (API) defining how the plug-in application may access the distributed presence enabled communication platform for contact presence information, which is displayed with the list of contacts via the electronic mail application. The electronic mail application utilizes the interface for broadcasting a message to multiple contacts in the list of contacts.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF SPECIFIC EMBODIMENTS

Reference will now be made in detail to the presently preferred embodiments of the invention, examples of which are illustrated in the accompanying drawings.

Referring to FIGS. 1 through 7, a system for broadcasting a message to multiple contacts in a list of contacts provided by an electronic mail application and providing presence information for contacts in the list of contacts provided by the electronic mail application are described in accordance with exemplary embodiments of the present invention. An interface, which comprises a software component such as a plug-in application 100, or the like, is provided for adding functionality to an electronic mail application 102, such as Microsoft Outlook or Outlook Express (© Microsoft Corporation), IBM Lotus Notes (© IBM Corporation), and other mail applications as contemplated by those of skill in the art.

Figure 1:
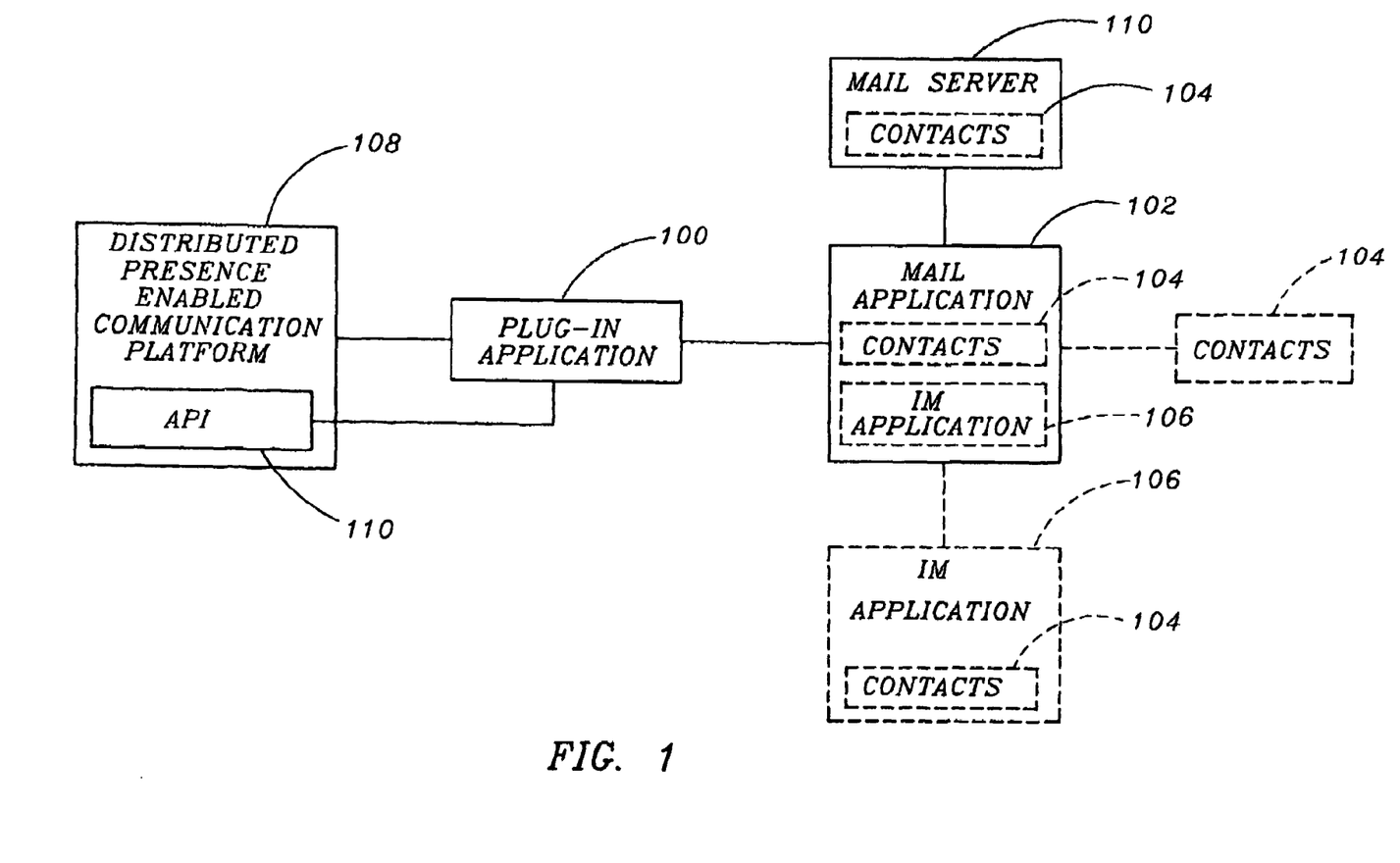
FIG. 1 is a block diagram illustrating a system for broadcasting a message to multiple contacts in a list of contacts provided by an electronic mail application and providing presence information for contacts in the list of contacts provided by the electronic mail application in accordance with an exemplary embodiment of the present invention.
Figure 2:
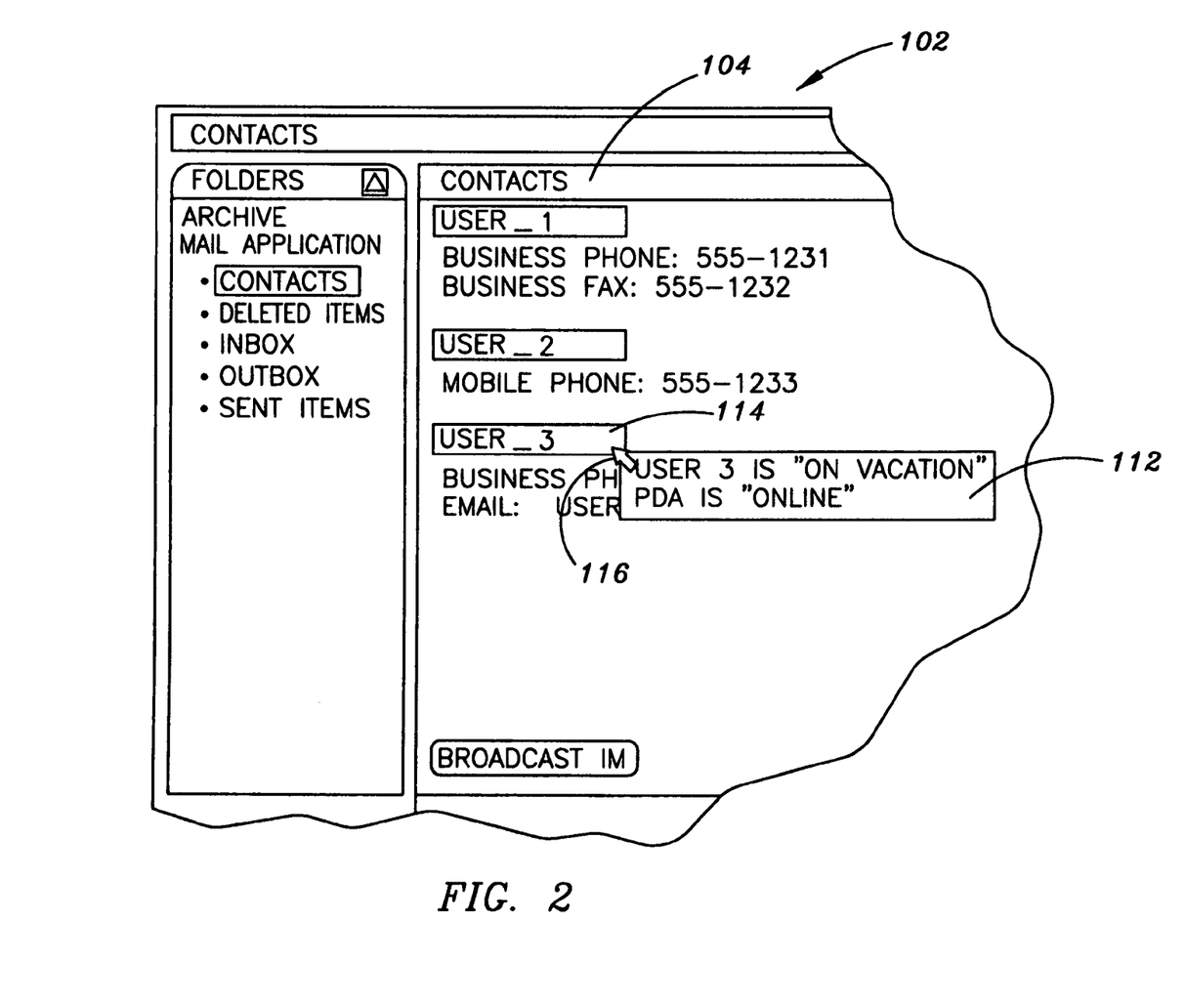
FIG. 2 is a view illustrating a mail application interface in accordance with an exemplary embodiment of the present invention, wherein user context information is displayed in accordance with an exemplary embodiment of the present invention.
Figure 3:
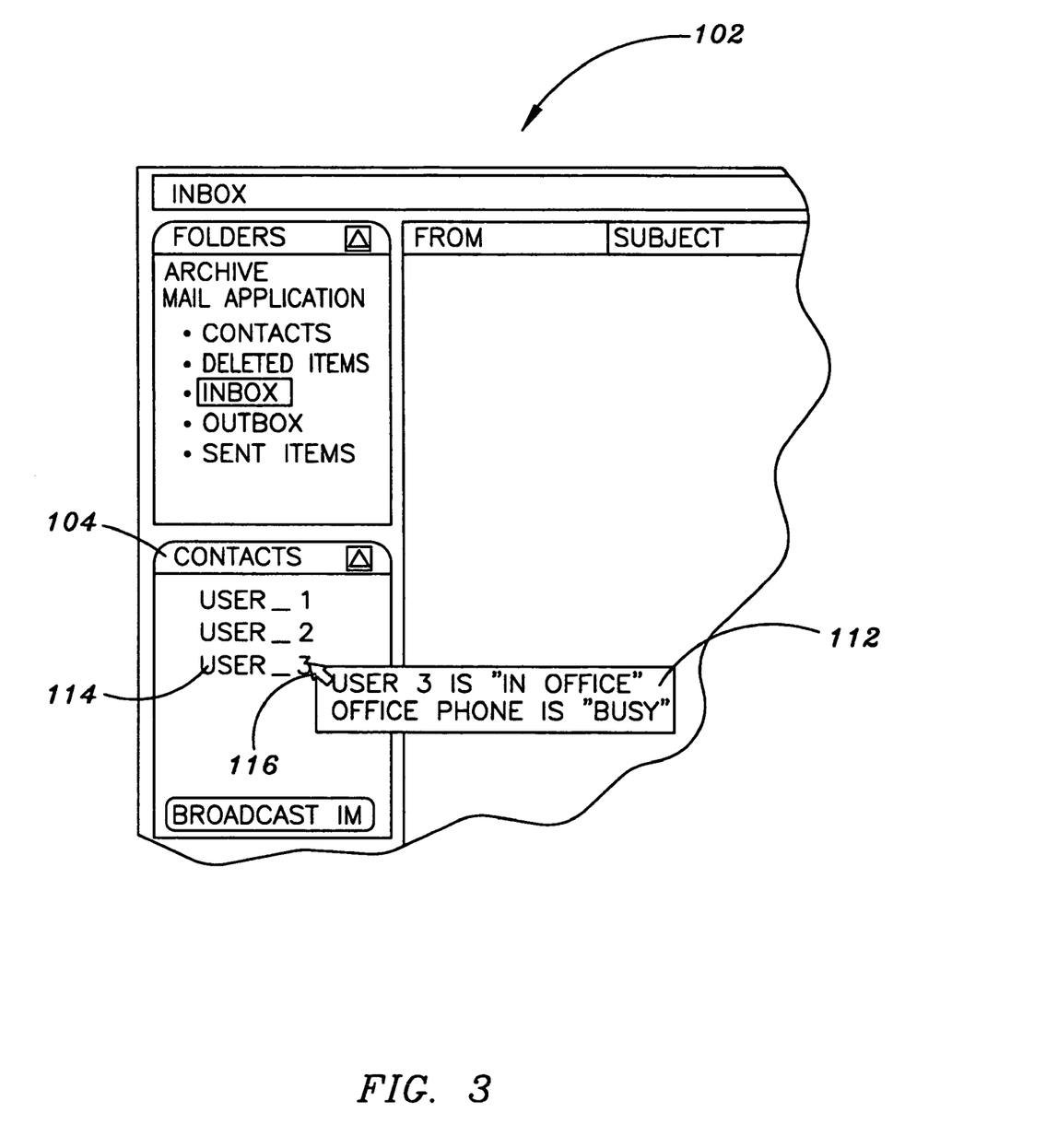
FIG. 3 is a view illustrating another mail application interface in accordance with an exemplary embodiment of the present invention, wherein user context information is displayed in accordance with an exemplary embodiment of the present invention.

The plug-in application 100 is added to the electronic mail application 102 for adding features such as facilitating broadcasting of a message to multiple contacts in a list of contacts 104 provided by the electronic mail application 102 and providing presence information for contacts in the list of contacts 104 provided by the electronic mail application 102. In embodiments, the plug-in application 100 is added to a mail application which supports instance messaging (IM). For example, in one specific embodiment, the plug-in application 100 is added to an electronic mail application 102 including an IM application 106. In another specific embodiment, the plug-in application 100 is added to an electronic mail application 102 which interfaces with an IM application 106. It is contemplated that the plug-in application 100 may be added to other mail applications including instant messaging functionality as well, without departing from the scope and intent of the present invention.

The plug-in application 100 is interfaced with a distributed presence enabled communication platform 108 for providing presence information to the electronic mail application 102. In embodiments, the distributed presence enabled communication platform 108 provides information regarding user availability for contacts in the list of contacts 104, such as information for determining which contacts are available online and which contacts are away (e.g., away from their computer terminals). It should be noted that the list of contacts 104 may be stored by the electronic mail application 102, by an IM application 106 which interfaces with the electronic mail application 102, by a mail server 110 interfaced with the electronic mail application 102, or by another application interfaced with the electronic mail application 102. Further, it will be appreciated that the list of contacts 104 may be transmitted to the electronic mail application 102 across a network or via other transmission techniques without departing from the spirit and scope of the present invention.

In order to provide presence information to the electronic mail application 102, the distributed presence enabled communication platform 108 includes an application programming interface (API) 110. The API 110 provides a set of calling conventions (e.g. software calls, functions, methods, protocols, routines, and tools prescribed by the distributed presence enabled communication platform 108) defining how the plug-in application 100 may access the distributed presence enabled communication platform 108 to determine a contact's availability. For instance, the API 110 allows the plug-in application 100 to interrogate the distributed presence enabled communication platform 108 for contact presence information which is then displayed via the electronic mail application 102.

In embodiments, the list of contacts 104 displayed by the electronic mail application 102 may include contact presence information retrieved from the distributed presence enabled communication platform 108. For example, in one specific embodiment, illustrated in FIGS. 2 and 3, contact presence information 112 is displayed proximal to a corresponding first contact 114 in the list of contacts 104 when a mouse pointer 116, or a like pointing device, hovers over the first contact 114. In other embodiments, the contact presence information 112 may be displayed when requested by a user. For example, a user may click on the first contact 114 using the mouse pointer 116 to view the contact presence information 112. Alternatively, a series of key strokes may be utilized. It is contemplated that the contact presence information 112 may be displayed in a variety of ways without departing from the scope and intent of the present invention.

Figure 4:
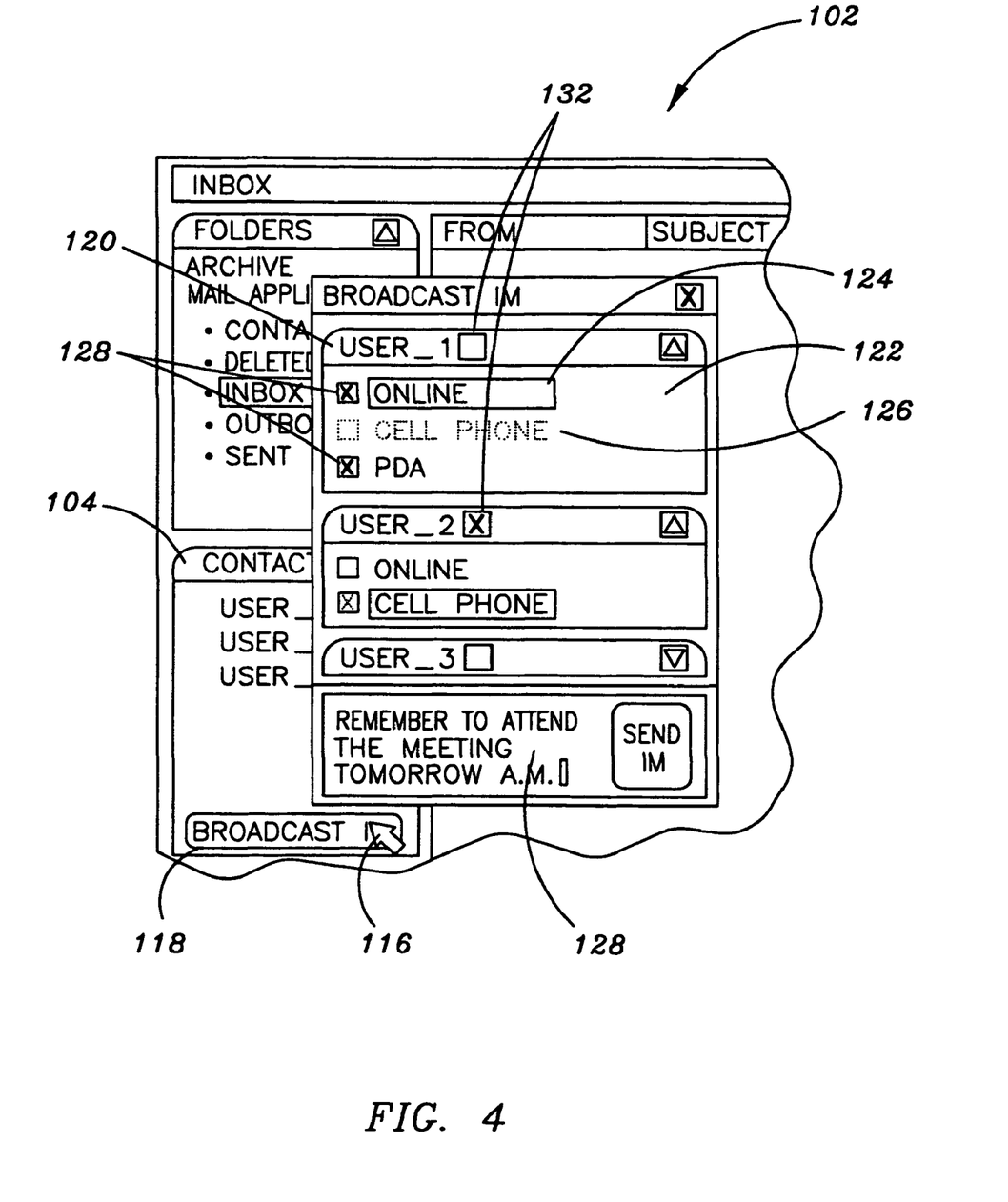
FIG. 4 is a view illustrating a further mail application interface in accordance with an exemplary embodiment of the present invention, wherein an instant messaging broadcast interface is displayed by the mail application in accordance with an exemplary embodiment of the present invention.

In embodiments, the electronic mail application 102 may utilize the plug-in application 100 for broadcasting a message to multiple contacts in the list of contacts 104. For example, in one specific embodiment, illustrated in FIGS. 4 and 5, the electronic mail application 102 may provide a button 118 added via the plug-in application 100 for opening a dialogue box or another interface for broadcasting a message to multiple contacts. As illustrated in FIG. 4, the dialogue box may include the list of contacts 104 displayed with contact presence information retrieved from the distributed presence enabled communication platform 108.

For instance, a second contact 120 may be displayed with a list of media 122 comprising presence information obtained from the distributed presence enabled communication platform 108. A highlighted region 124, or another visual cue, may be utilized to identify media at which the second contact 120 may be readily contacted. Similarly, a grayed out region 126, or another visual cue, may be utilized to identify media at which the second contact 120 may not be readily contacted. Check boxes 128 or other various selection tools may be provided for selecting media to which an instant message 130 should be routed. Alternatively, another set of selection boxes 132 may be provided for indicating that the electronic mail application 102 may select the best routing destination from the list of media 122 based on information received form the distributed presence enabled communication platform 108.

Figure 5:
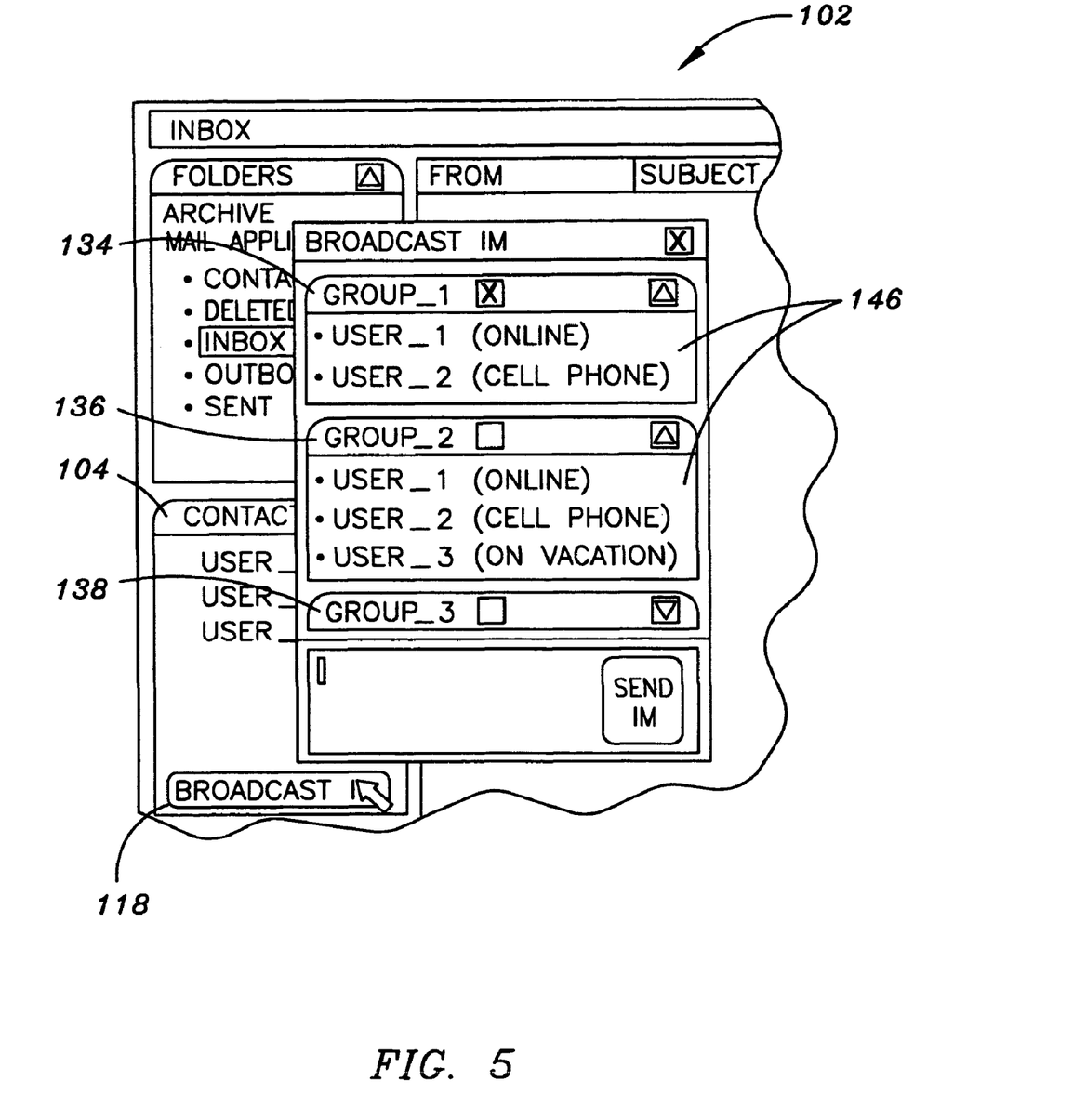
FIG. 5 is a view illustrating another mail application interface in accordance with an exemplary embodiment of the present invention, wherein another instant messaging broadcast interface is displayed by the mail application in accordance with an exemplary embodiment of the present invention.

As illustrated in FIG. 5, the dialogue box may include the list of contacts 104 assigned to various groups, such as a first group 134, a second group 136, and a third group 138. Contact presence information 140 may be provided to identify media at which members of the first group 134, the second group 136, and the third group 138 may be readily contacted. Those of skill in the art will appreciate that while the interfaces illustrated in FIGS. 2 through 5 have been described with some specificity, these interfaces are exemplary and explanatory only, and are not restrictive of the invention. Thus, other interfaces including different functionality may be provided which still fall within the scope and extent of the present invention.

Figure 6:
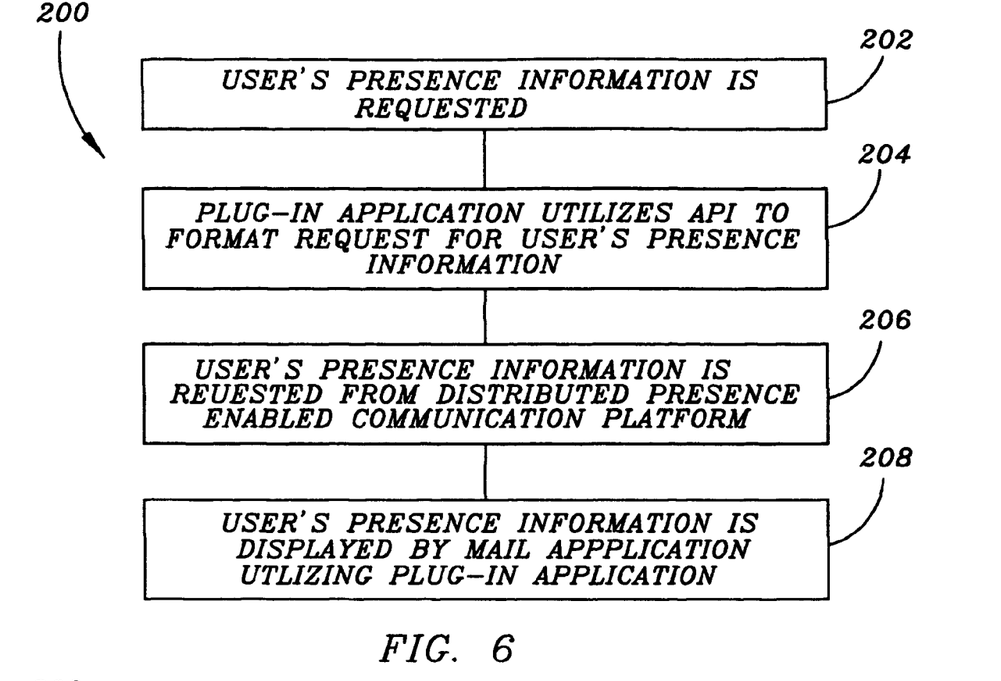
FIG. 6 is a flow diagram illustrating a method for providing presence information for contacts in a list of contacts provided by an electronic mail application in accordance with an exemplary embodiment of the present invention.

Referring now to FIG. 6, a method 200 for providing presence information for contacts in a list of contacts provided by an electronic mail application is described. First, a contact's presence information is requested, 202. For example, the electronic mail application may utilize a plug-in application to request the contact's presence information from a distributed presence enabled communication platform. The plug-in application may utilize an application programming interface (API) provided by the distributed presence enabled communication platform to format the request for the contact's information, 204.

In exemplary embodiments, the distributed presence enabled communication platform is configured for determining the contact presence information of a contact for different media utilized by the contact. For instance, the contact may utilize two or more of instant messaging via a network, a telephone, a mobile telephone, a paging service, text messaging via a wireless network, and other various media. Preferably, the distributed presence enabled communication platform is configured for selecting the media at which the contact may be readily contacted.

Once the contact's presence information has been requested from the distributed presence enabled communication platform, 206, the distributed presence enabled communication platform determines the contact's presence information and provides it to the electronic mail application via the plug-in application. Then, the contact's presence information is provided by the electronic mail application utilizing the plug-in application, 208 (e.g., the electronic mail application displays the contact information via an interface).

Figure 7:
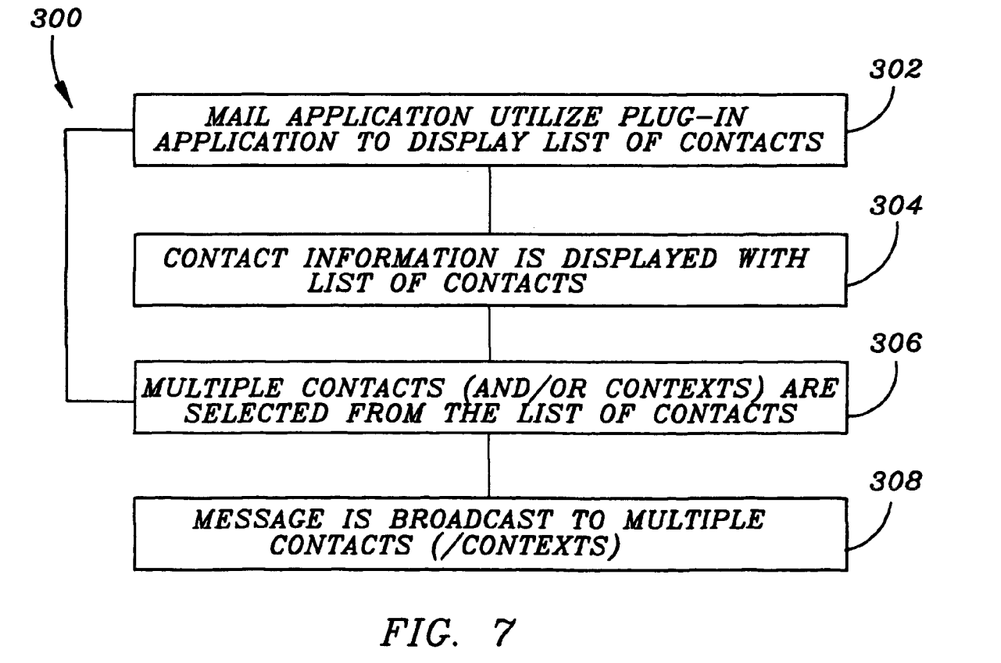
FIG. 7 is a flow diagram illustrating a method for broadcasting a message to multiple contacts in a list of contacts provided by an electronic mail application in accordance with an exemplary embodiment of the present invention.

Referring now to FIG. 7, a method 300 for broadcasting a message to multiple contacts in a list of contacts provided by an electronic mail application is described. The electronic mail application utilizes a plug-in application to display a list of contacts, 302. The list of contacts may be stored by the electronic mail application, by an IM application which interfaces with the electronic mail application, by a mail server interfaced with the electronic mail application, or by another application interfaced with the electronic mail application. Preferably, the list of contacts is displayed by an interface for entering and sending an instant message. In specific embodiments, contact information obtained from a distributed presence enabled communication platform may be displayed with the list of contacts, 304. The presence information may include two or more media for each contact, such as contexts including instant messaging via a network, a telephone, a mobile telephone, a paging service, text messaging via a wireless network, and other various media.

In one embodiment, the electronic mail application receives multiple selections from the list of contacts displayed via the interface, 306. For example, in one instance a first contact and a second contact are selected from the list of contacts. In another instance, a first context and a second context (e.g., first and second media) are selected from a list of contexts. The first and second contexts may be selected for the same contact, or, alternatively, for different contacts. In another embodiment, the interface selects a first context and a second context (e.g., first and second media) from the list of contexts. For example, the interface may select one or more contexts for a contact based on context information received from the distributed presence enabled communication server. Finally, the message is broadcast simultaneously to the contacts and/or contexts selected from the list of contacts, 308.

In exemplary embodiments, the message is broadcast by the electronic mail application via an instant messaging service. For example, the message may be broadcast by an electronic mail application including an IM application. In another embodiment, the electronic mail application interfaces with an IM application for broadcasting the message. It is further contemplated that the message may be broadcast by other mail applications including instant messaging functionality as well, without departing from the scope and intent of the present invention.

In the exemplary embodiments, methods 200 and 300 may be implemented as sets of instructions or software readable by the radiographic imaging device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for broadcasting a message to multiple contacts in a list of contacts provided by an electronic mail application, comprising:

displaying a list of contacts, each contact included in the list of contacts including a list of media, a media from the list of media in which each contact is reachable includes a visual indicator;

receiving a selection of a first contact from the list of contacts to which the message is to be broadcast, the selection of the first contact includes a selection of a first media which is used for contacting the first contact;

receiving a selection of a second contact from the list of contacts to which the message is to be broadcast, the selection of the second contact includes a selection of a first media which is used for contacting the second contact;

providing presence information for contacts in the list of contacts provided by the electronic mail application, the presence information being provided for each media in the list of media for each contact in the list of contacts, the list of media including a network, a mobile phone and an office telephone, wherein providing presence information for contacts in the list of contacts comprises:

interrogating a distributed presence enabled communication platform for contact presence information, the distributed presence enabled communication platform for determining the contact presence information of a contact in the list of contacts for Instant messaging via said network, said mobile phone and said office telephone;

determining contact presence information for the contact in the list of contacts for the Instant messaging via said network, the mobile phone and the office telephone; and causing the electronic mail application to provide the determined contact presence information of each media of the list of media of the contact in the list of contacts; and causing the message to be simultaneously broadcast to the first contact and the second contact via instant messaging.

2. The method as claimed in claim 1, wherein the step of interrogating the distributed presence enabled communication platform comprises using an API to format a request for the contact presence information.

3. The method as claimed in claim 1, wherein a media from the list of media in which each contact is unreachable includes a second visual indicator.

4. The method as claimed in claim 1, wherein the selection of the first contact includes the selection of a second media which is used for contacting the first contact.

5. The method as claimed in claim 1, wherein the selection of the second contact includes the selection of a second media which is used for contacting the second contact.

* * * * *